US010465615B2

(12) United States Patent
Dudar

(10) Patent No.: US 10,465,615 B2
(45) Date of Patent: Nov. 5, 2019

(54) ENGINE COOLING BY ELECTRICALLY DRIVEN INTAKE AIR COMPRESSOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/786,325

(22) Filed: Oct. 17, 2017

(65) Prior Publication Data

US 2019/0112991 A1   Apr. 18, 2019

(51) Int. Cl.
| | |
|---|---|
| *F02D 17/02* | (2006.01) |
| *F01P 7/02* | (2006.01) |
| *F02D 13/06* | (2006.01) |
| *F01P 1/02* | (2006.01) |
| *F01P 5/04* | (2006.01) |

(52) U.S. Cl.
CPC .............. *F02D 17/026* (2013.01); *F01P 7/02* (2013.01); *F02D 13/06* (2013.01); *F01P 2001/023* (2013.01); *F01P 2005/046* (2013.01); *F01P 2025/08* (2013.01)

(58) Field of Classification Search
CPC ...... F02D 17/026; F02D 13/06; F02D 17/023; F02D 17/04; F02D 13/08; F01P 7/02; F01P 2001/023; F01P 2005/046; F01P 2025/08
See application file for complete search history.

(56) References Cited

U.S. PATENT DOCUMENTS

| | | | |
|---|---|---|---|
| 6,532,926 B1 | 3/2003 | Kuroda et al. | |
| 6,763,298 B2 * | 7/2004 | Boggs | B60K 6/445 701/112 |
| 7,204,235 B1 | 4/2007 | Gebby et al. | |
| 8,739,766 B2 * | 6/2014 | Jentz | F02N 11/003 123/516 |
| 9,217,379 B2 | 12/2015 | Willard et al. | |
| 9,267,423 B2 | 2/2016 | Russ et al. | |
| 9,669,825 B1 | 6/2017 | Dudar | |
| 2007/0000265 A1 * | 1/2007 | McEnaney | B60H 1/321 62/228.4 |
| 2012/0204539 A1 | 8/2012 | Gonze et al. | |

* cited by examiner

*Primary Examiner* — Syed O Hasan
(74) *Attorney, Agent, or Firm* — Geoffrey Brumbaugh McCoy Russell LLP

(57) ABSTRACT

Methods and systems are provided for cooling an engine by operating an electrically driven intake air compressor. In one example, in response to a determination, based on a measured or inferred engine temperature, that the engine temperature is greater than a threshold temperature, employing the vehicle's electrically driven intake air compressor to route air through a charge air cooler and engine cylinders, while engine spins unfueled. In this way the engine temperature may be reduced even under conditions not normally amenable to engine cooling, such as at idle-stops or when an engine coolant system is degraded.

20 Claims, 7 Drawing Sheets

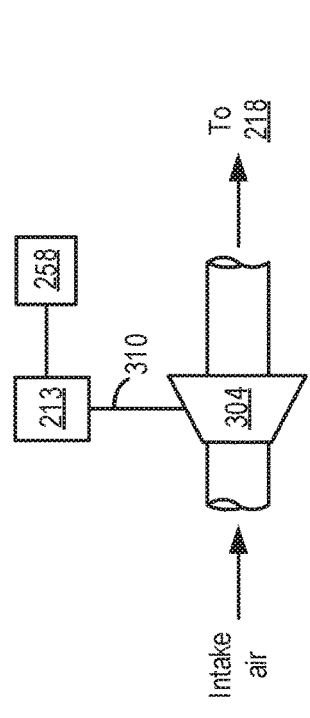
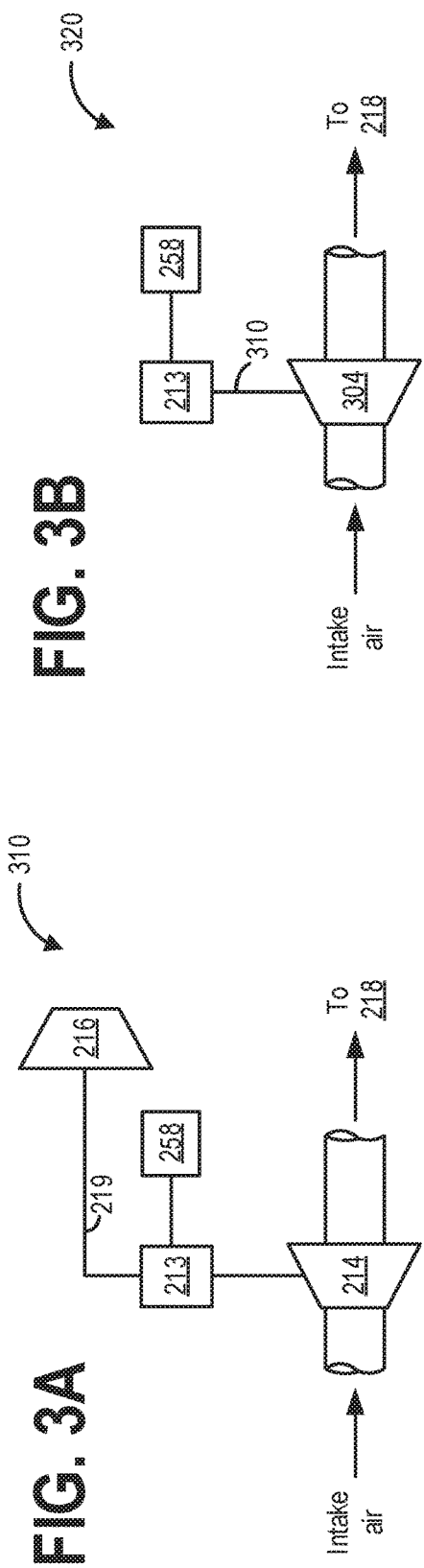
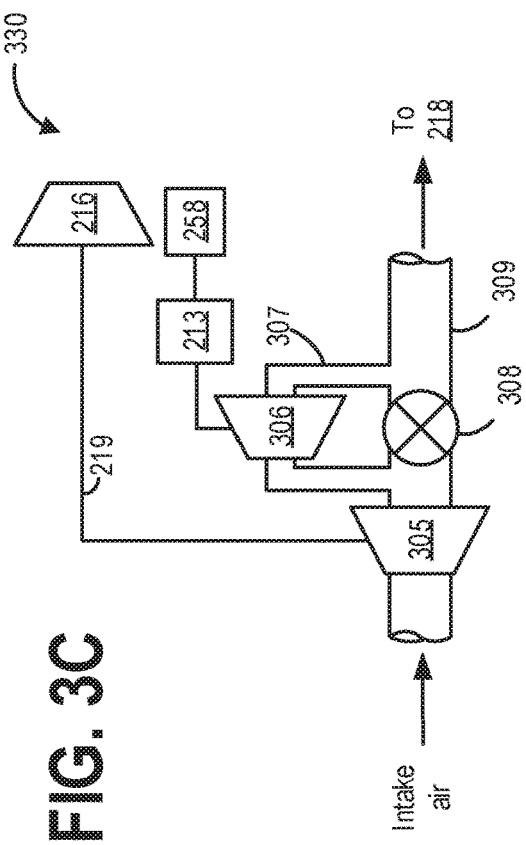

ENGINE COOLING BY ELECTRICALLY DRIVEN INTAKE AIR COMPRESSOR

FIELD

The present description relates generally to methods and systems for controlling a vehicle's electrically driven intake air compressor to cool an overheated vehicle engine.

BACKGROUND/SUMMARY

Vehicles may include a coolant systems configured to reduce overheating of an engine by transferring the heat to ambient air. Therein, coolant is circulated through the engine block to remove heat from the hot engine, and the heated coolant is then circulated through a radiator near the front of the vehicle. Heated coolant may also be circulated through a heat exchanger to heat a passenger compartment. The coolant system may include various components such as various valves, pumps, and one or more thermostats. In the event of a cooling system degradation due to component malfunction (e.g., water pump degradation), or due to loss of coolant from the cooling system (e.g., due to a coolant leak), the engine may overheat. Engine overheating may be exacerbated in turbocharged direct injected engines which tend to run hotter due to boost and higher loads.

Various approaches have been developed to address engine overheating in the event of coolant system degradation. One example approach, shown by Willard et al. in U.S. Pat. No. 9,217,379, addresses engine overheating by alternately shutting down fuel to one or more cylinders while maintaining vehicle torque demand with the fueled cylinders. Cylinder cooling is achieved as cool un-combusted air flows through the unfueled cylinders. By shutting off fuel on an individual cylinder basis, flexibility in cooling and torque control is provided. In still other approaches, cylinder fueling may be shut off on a bank-wise basis to cool the deactivated bank, while the active bank continues to generate torque for vehicle propulsion.

The inventors herein have recognized potential issues with the above approach. As one example, in engines configured with start-stop capabilities, even with all cylinders deactivated, under-hood temperatures may continue to climb. Due to the vehicle being static and not moving, even if additional cooling fans are activated, the idle-stopped engine may continue to overheat. If the engine is restarted to increase cooling air flow, the fuel economy benefit associated with the start-stop operation may be lost. Likewise, in a hybrid electric vehicle, pulling up a shutdown engine (by transitioning out of an electric-only mode) to flow cool air through the overheated engine may result in a net fuel penalty.

The inventors herein have developed systems and methods to at least partially address the above issues. In one example, a method for cooling an overheated engine includes while engine temperature is greater than a threshold temperature and when engine idle-stop conditions are met, spinning an engine unfueled and operating an electrical intake air compressor to route air to engine cylinders via a charge air cooler. In this way, engine cooling can be expedited without needing to restart the engine.

As one example, a boosted engine may be configured with an intake compressor coupled to an electric motor. The electric intake compressor may be included in an electric turbocharger, or may be coupled to a mechanical turbocharger, downstream of a turbine-drive intake compressor. Responsive to engine idle-stop conditions being met, engine fueling may be disabled. In addition, engine temperature may be assessed. Responsive to a higher than threshold engine temperature, or a higher than threshold rate of rise in engine temperature, an engine controller may spin the engine unfueled (such as via a starter motor, or a hybrid driveline electric motor), while also enabling the electric intake compressor. Therein, a pulse-width commanded to the electric motor driving the electric intake compressor may be increased as the degree of engine cooling required increases. As a result of compressor operation intake air, drawn in via the spinning engine, may be delivered to engine cylinders after being cooled upon passage through a charge air cooler. Once the engine is sufficiently cooled, the electric intake compressor may be disabled and the engine may be spun to, and maintained at, rest until engine restart conditions are met. In one example, the electric intake compressor operation may be performed while existing coolant system fans are operated to expedite the cooling. In still further examples, responsive to engine overheating while a hybrid electric vehicle is operated in an engine-only or an assist mode, the vehicle may be temporarily transitioned to an electric-only mode, and operation of the electric intake compressor may be coordinated with the unfueled spinning of the engine to lower the engine temperature. Thereafter, engine operation may be resumed.

In this way, engine overheating may be quickly addressed without requiring an engine to be pulled up for cooling purposes. By spinning an engine unfueled, air can be drawn into the engine cylinders. By concurrently spinning an intake compressor via an electric motor, compressed air can be cooled upon passage through a charge air cooler before it is delivered to the cylinders. The technical effect of flowing cooled, compressed air through the cylinders is that heat loss from cylinder walls and pistons can be expedited, reducing engine and under-hood temperature rise. By operating the electric intake compressor alongside a cooling fan, engine temperatures may be maintained within a target range even when the engine is shutdown. By expediting engine cooling during conditions when an engine is shutdown, such as during an idle-stop, engine restarts responsive to engine overheating can be reduced, prolonging the duration and fuel economy benefits of an engine idle-stop.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-3C show example embodiments of the electric intake compressor of FIGS. 1 and 2.

DETAILED DESCRIPTION

Figure 1:
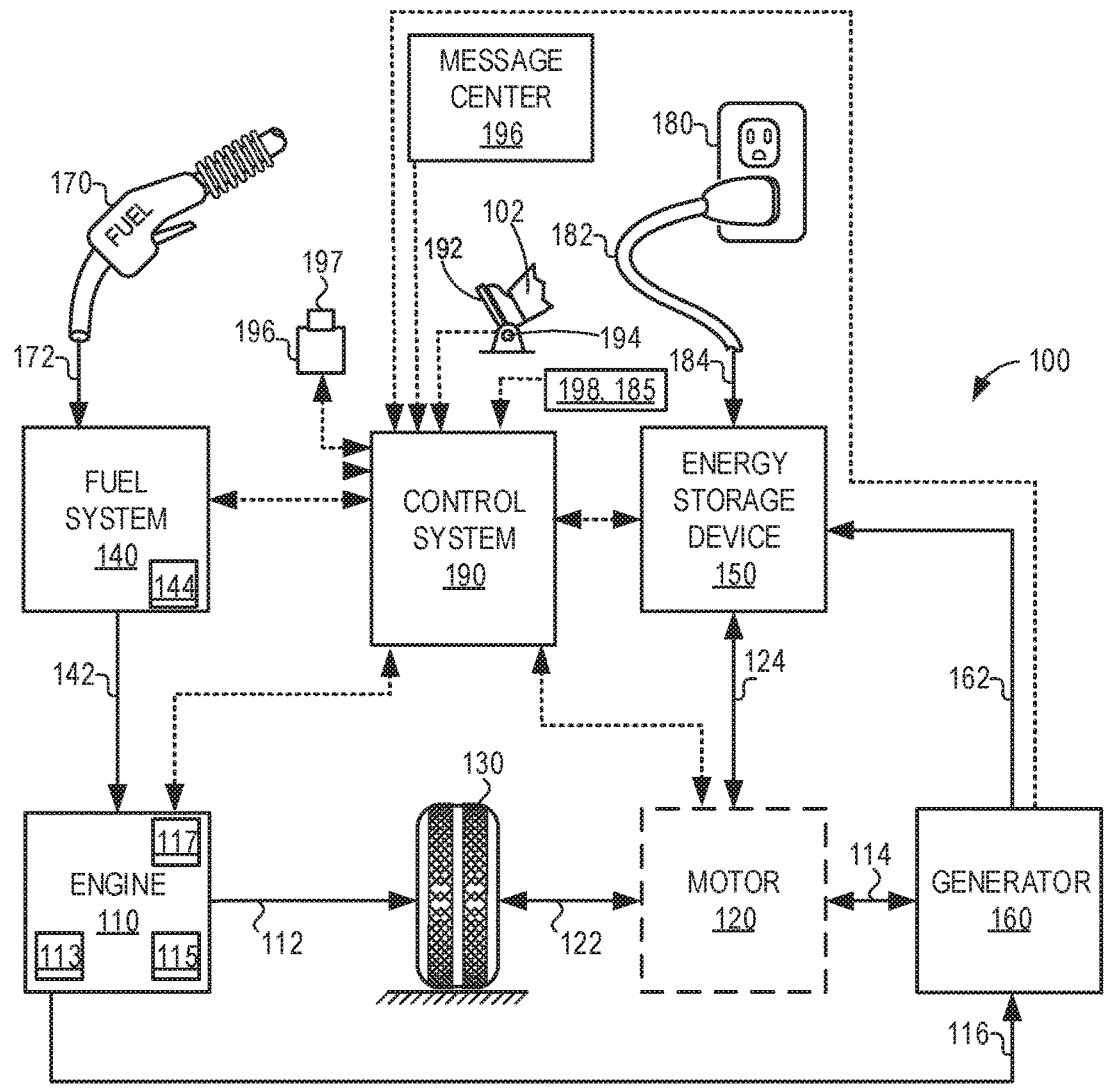
FIG. 1 shows an example vehicle propulsion system.

The following description relates to systems and methods for cooling an overheated engine in a vehicle propulsion system, such as the hybrid electric vehicle system shown in FIG. 1. Specifically, the description relates to cooling an overheated vehicle engine using an electrically driven intake air compressor (EDIAC) included in a boosted engine system, such as the system of FIG. 2. Example embodiments of the EDIAC are shown in FIGS. 3A-3C. An engine controller may be configured to perform a control routine, such as the example routine of FIG. 4, to operate the EDIAC to expedite engine cooling during an idle-stop. In addition, the intake compressor may be operated for engine temperature control in a hybrid electric vehicle, as given by the method of FIG. 5. Example cooling operations are shown with reference to FIGS. 6-7.

FIG. 1 illustrates an example vehicle propulsion system 100. Vehicle propulsion system 100 includes a fuel burning engine 110 and may include a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 which includes a motor may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode). During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated (herein also referred to as an engine-only mode). During other operating conditions, both engine 110 and motor 120 may each be operated to propel the vehicle via drive wheel 130 as indicated by arrows 112 and 122, respectively (herein also referred to as an assist mode). A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Engine 110 may be configured with start/stop capabilities wherein the control system 190 may automatically shut down (idle-stop) the internal combustion engine 110, without receiving operator input to shut down the engine, if selected idle-stop conditions are met. These may include, for example, torque demand being less than a threshold, the on-board battery being sufficiently charged, no request being received for air-conditioning, etc. In one example, the engine may be shut-down responsive to the engine being idled while the vehicle is stopped at a traffic signal. Likewise, the engine may be automatically restarted responsive to the torque demand being higher than the threshold, the battery requesting to be charged, an air-conditioning compressor requesting to be operated, etc. In one example, the engine may be restarted responsive to the operator applying the accelerator pedal after being stopped for a duration at a traffic signal. The engine may be cranked unfueled via a motor, such as a starter motor coupled to a crankshaft of the engine, until a threshold engine speed is reached, after which the motor may be disabled and engine fueling may be resumed. Thereafter engine combustion may be able to support engine spinning. As a result of the automatic start/stops, fuel consumption and exhaust emissions can be reduced.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. In still further examples, as elaborated with reference to FIG. 2, the energy storage device may be used to power an electric motor coupled to an electrically driven intake air compressor (EDIAC) 113. As elaborated at FIGS. 4-5, the EDIAC may be operated for boost pressure control during fueled engine operation, and may also be used for engine temperature control during unfueled engine rotation. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle propulsion system 100 may also include ambient temperature sensor 198, humidity sensor 185, and engine temperature sensor 115. In one example, engine temperature sensor 115 is an engine coolant temperature (ECT) sensor wherein the engine temperature is inferred from the engine coolant temperature. In another example, engine temperature sensor 115 is a cylinder head temperature (CHT) sensor wherein the engine temperature is inferred from the cylinder head temperature. Further, engine 110 may include an engine coolant system 117 for engine temperature control which may include various components such as a radiator, additional cooling fans, a coolant pump, a water pump, and a coolant reservoir (or sump). As will be discussed in more detail below, during conditions when the engine is idle-stopped and the engine is overheated, the EDIAC 113 may be employed to expedite engine cooling. Briefly, while the engine is spun unfueled, EDIAC 113 operation drives air through the charge air cooler (CAC) and then drives the cooled air into the engine cylinders, cooling the cylinder walls and pistons.

Figure 2:
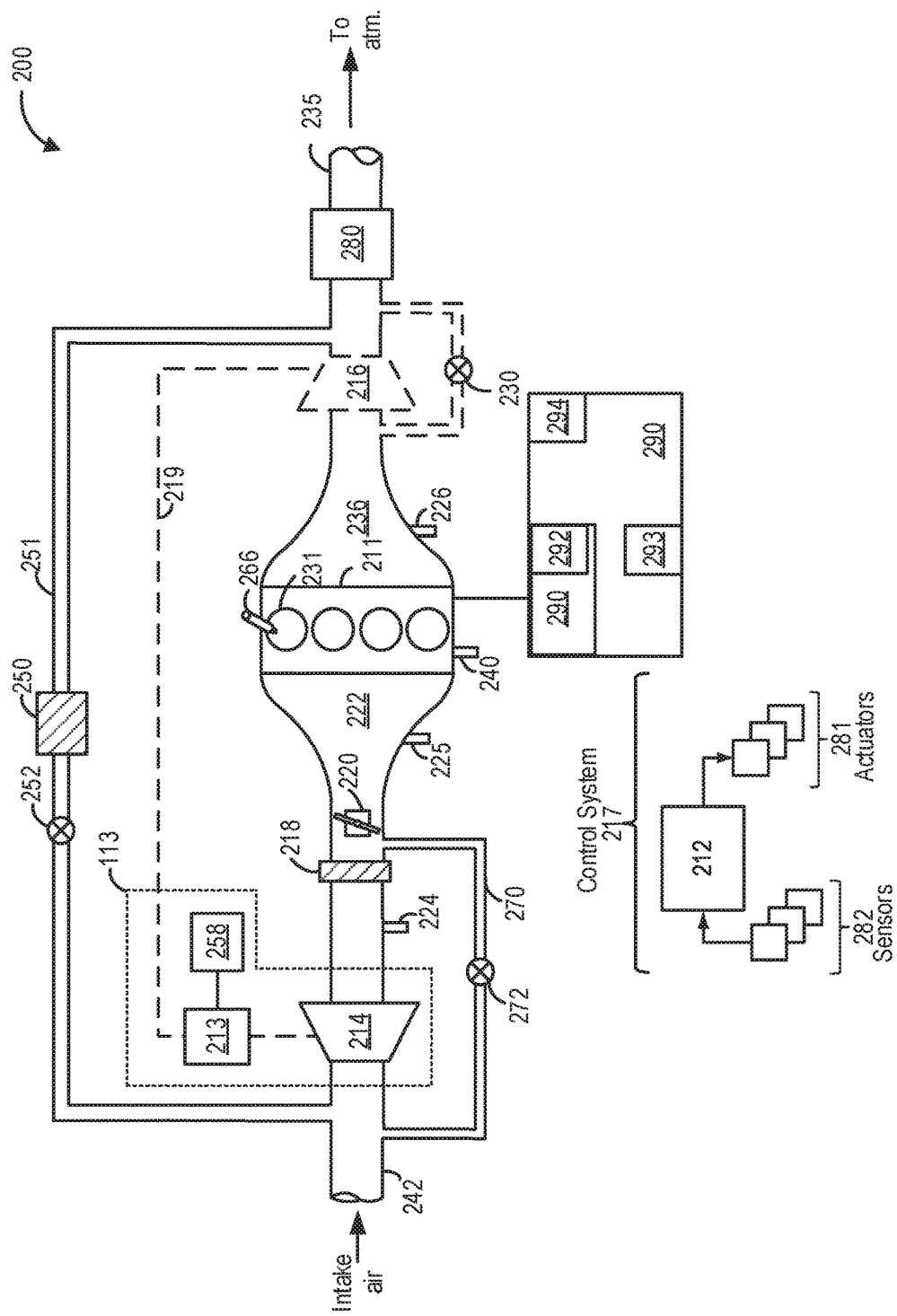
FIG. 2 shows an example engine system including an electric intake compressor coupled in the vehicle propulsion system of FIG. 1.

Referring now to FIG. 2, a schematic of an engine system 200 is shown. The engine system 200 is comprised of a multi-cylinder engine 211, which may be included in a propulsion system of an automobile, such as the propulsion system shown in FIG. 1. In one example, engine 211 may be an embodiment of engine 110 of FIG. 1.

Engine 211 may be configured as a boosted engine receiving intake air compressed via an electrically driven intake air compressor EDIAC 113. Various configurations of EDIAC may be possible. As non-limiting examples, EDIAC 113 may include an electrically driven compressor also coupled to a turbine in an electric turbocharger, an electrically driven compressor of a supercharger, and an electrically driven auxiliary compressor (herein also referred to as an e-booster) coupled in a bypass upstream or downstream of a primary intake compressor, as shown in FIGS. 3A-3C.

Briefly, an electrically driven turbocharger refers to a turbocharger system in which an intake air compressor may receive power directly from an electric motor and/or from a turbine (such as turbine 216), an electrically driven supercharger refers to an intake air compressor driven solely by an electric motor, while an e-booster refers to a system comprising a traditional turbocharger system with an additional electrically driven compressor downstream from the first mechanically driven compressor. More details on the various EDIAC embodiments will be given in FIGS. 3A-3C.

Fresh air is introduced along intake passage 242, flows to EDIAC 113 where it is compressed before continuing on to the engine cylinders. EDIAC 113 includes a compressor 214 for compressing intake air, motor 213 to spin the compressor 214, and an electric energy storage device 258 to supply electrical energy to electric motor 213. In one example, electric energy storage device 258 is a battery. In another example, electric energy storage device is a capacitor. In the case EDIAC 113 is an electric turbocharger, as depicted, the compressor may also be mechanically coupled to, and driven by turbine 216 via shaft 219. Thus, when EDIAC 113 is embodied as an electric turbocharger, the compressor 214 may be driven by power from one or both of the electric motor 213, and the turbine 216. Turbine 216 spinning may be induced by the flow of exhaust gases there-through. However, in some EDIAC 113 embodiments, the electric motor 213 may alternatively be coupled to shaft 219 or to turbine 216, wherein the output of the turbine can be adjusted via motor output adjustments. Although the EDIAC 113 as depicted in FIG. 2 is of the form of an electric turbocharger, it will be appreciated that other EDIAC 113 embodiments are possible, such as those shown in FIG. 3A-3C.

Since boosting upon passage through the compressor results in heating of the air-charge, a charge air cooler 218 may be coupled downstream of EDIAC 113 for cooling the boosted air before it is delivered to engine cylinders. The CAC may be an air-to-air or air-to-water heat exchanger, for example. In one example, CAC may be coupled to an engine coolant system 290 wherein coolant from engine coolant system 290 may also be circulated through CAC 218. Throttle 220 is coupled to engine intake manifold 222 downstream of CAC 218.

Pressure of the air charge within the intake manifold 222 may be sensed by manifold air pressure (MAP) sensor 225 while a boost pressure at the outlet of EDAIC may be sensed by boost pressure sensor 224. Compressor recirculation valve (CRV) 272 may be coupled in a bypass passage 270 between the inlet and the outlet of EDIAC 113. By adjusting an opening of CRV 272, at least a portion of boosted intake air charge may be recirculated around the compressor. Compressor recirculation valve 272 may be a normally closed valve configured to open under selected operating conditions to relieve excess boost pressure. For example, CRV 272 may be opened during conditions of decreasing engine speed to avert compressor surge. Specifically, to reduce compressor surge, such as on a driver tip-out, boost pressure may be dumped from the intake manifold 222, downstream of CAC 218 and upstream of intake throttle 220, to intake passage 242 by increasing an opening of CRV 272. By flowing boosted air from upstream of an intake throttle inlet to upstream of the EDIAC 113 inlet, boost pressure may be rapidly reduced, expediting boost control. CRV 272 may be a continuously variable valve whose position can be adjusted to a fully open position, a fully closed position, or any position there-between.

Intake manifold 222 may be coupled to a series of combustion chambers 231 of engine 211 through a series of intake valves (not shown). Combustion chambers 231 may be supplied one or more fuels, such as gasoline, alcohol fuel blends, diesel, biodiesel, compressed natural gas, etc. Fuel may be supplied to the combustion chambers via fuel injector 266. In the depicted example, fuel injector 266 is configured for direct injection though in other embodiments, fuel injector 266 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition. Engine temperature may be measured or estimated via one or more temperature sensors, such as engine temperature sensor 240.

The combustion chambers 231 may be further coupled to exhaust manifold 236 via a series of exhaust valves (not shown). In the depicted embodiment, a single exhaust manifold 236 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 226 is shown coupled to exhaust manifold 236 upstream of turbine 216. Alternatively, a two-state exhaust gas oxygen sensor may be substituted for UEGO sensor 226. It is understood that UEGO sensor 226 may also be any other suitable sensor for providing an indication of exhaust gas air-fuel ratio in the exhaust system.

Engine 211 may have an associated coolant system 290 for maintaining engine temperature within a desired range. Coolant system 290 may be operated to reduce engine 211 temperature by actuating a coolant pump 293 to flow liquid coolant, drawn from a coolant sump or reservoir 294, around engine 211 as well as through channels within the engine 211. After passing through the engine and absorbing engine heat, the heated coolant passes through narrow channels within a radiator 291 where it may release heat to ambient air. A radiator fan 292 may be coupled to radiator 291 for blowing ambient air past the radiator 291, thereby increasing the rate of heat transfer between coolant and air, especially in situations where the vehicle is stationary. In further examples, the heated coolant may be circulated through a heater core (not shown) where the heat may be rejected to components requiring heating (such as for cabin heating). Finally the coolant returns to the coolant sump (or reservoir) 294. Coolant system 290 operation, including pump output and cooling fan speed, may be controlled by vehicle control system 217 based on the output of one or more temperature sensors, such as engine temperature sensor 240.

Engine 211 may also include an exhaust gas recirculation (EGR) system for recirculating exhaust gas from an exhaust manifold to an intake manifold, to help lower NOx and other exhaust emissions. For example, engine 211 may include a low pressure EGR system, as depicted, wherein exhaust gas is recirculated, via a low pressure EGR passage 251, from the exhaust manifold at a location downstream of exhaust turbine 216, to the intake manifold 222, at a location upstream of intake compressor 113. An amount of exhaust gas recirculated to the engine intake may be controlled via adjustments to the opening of EGR valve 252. The heated exhaust gas may be cooled upon passage through EGR cooler 250 before being recirculated to the intake passage.

Exhaust from one or more exhaust manifold sections is directed to turbine 216 to drive the turbine. When reduced turbine torque is desired, some exhaust may be directed instead through waste gate 230, bypassing the turbine. In some embodiments, turbine 216 may be coupled to electric motor 213, which may be operated in motor mode to provide an electric assist. In particular, the electric motor may be operated for providing additional torque to turbine 216 to meet an increase in torque demand. When coupled to turbine 216, the electric motor may also be operated in a generator mode for generating electrical energy when the turbine torque exceeds the torque demand. The excess electrical energy may be stored in energy battery 258.

The combined flow from the turbine 216 and the waste gate 230 then flows through an emission control device 280. Emission control device 280 may be configured to catalytically treat the exhaust flow to reduce an amount of one or more substances in the exhaust flow. Emission control device 280 may include a three-way catalyst (TWC), an oxidation catalyst, a reduction catalyst, or combinations thereof. Upon passage through the emission control device 280, the treated exhaust may be released into the atmosphere via exhaust conduit 235.

The engine system 200 may further include control system 217. Control system 217 is shown receiving information from a plurality of sensors 282 and sending control signals to a plurality of actuators 281. Sensors 282 may include UEGO sensor 226 for estimating an exhaust gas air-fuel ratio, boost pressure sensor 224 for estimating boosted manifold pressure downstream of EDIAC 113, engine temperature sensor 240, and other sensors, such as additional pressure, temperature, air/fuel ratio, and flow rate sensors coupled to various locations in the vehicle system 200. As another example, the actuators may include fuel injectors 266, throttle 220, coolant pump 293, radiator fan 292, electric motor 213, etc. Control system 217 may receive input data from the various sensors, process the input data, and trigger the various vehicle actuators in response to the processed input data based on instruction or code programmed therein corresponding to one or more routines. For example, responsive to an engine temperature being higher than a threshold, as inferred based on the output of the engine temperature sensor, the control system may send a command signal to the radiator fan to increase a fan speed, and to the coolant pump to increase a coolant pump output. Example control routines are described herein with regard to FIGS. 4-5.

Figure 4:
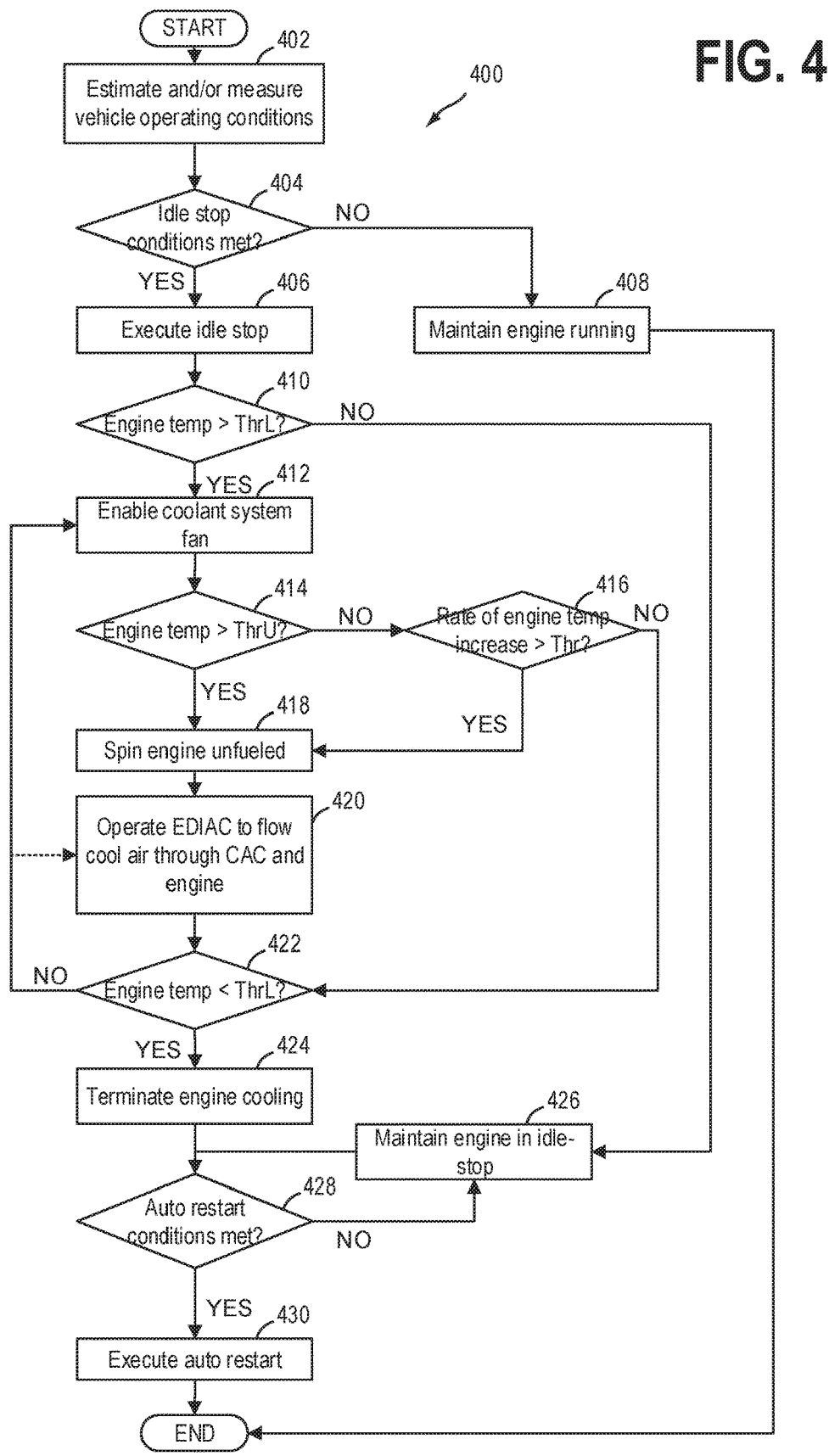
FIG. 4 shows a high level flowchart of an example method for cooling an overheated vehicle engine during idle-stops.

As elaborated with reference to FIG. 4, based at least on an engine temperature (as may be indicated by temperature sensor 240) and while the engine is in an idle-stop condition, control system 217 may operate EDIAC 113 in conjunction with unfueled engine spinning to reduce engine temperature. Therein, while an engine temperature is greater than a threshold temperature, and while an idle-stop is being executed (e.g., where engine fueling has been deactivated), intake air may be compressed by EDIAC 113 and blown through CAC 218 while the engine is spun unfueled via a motor. As the intake air travels through CAC 218, it will be cooled prior to entering engine cylinders (such as engine cylinder 231). As the cooled intake air passes through engine cylinders, engine temperatures may be reduced, averting engine overheating. The EDIAC operation may be in addition to the operation of cooling system fans and pumps. In this way, EDIAC 113 assisted engine cooling may continue until engine restart conditions are met, or until the engine 211 temperature is sufficiently reduced.

Figure 5:
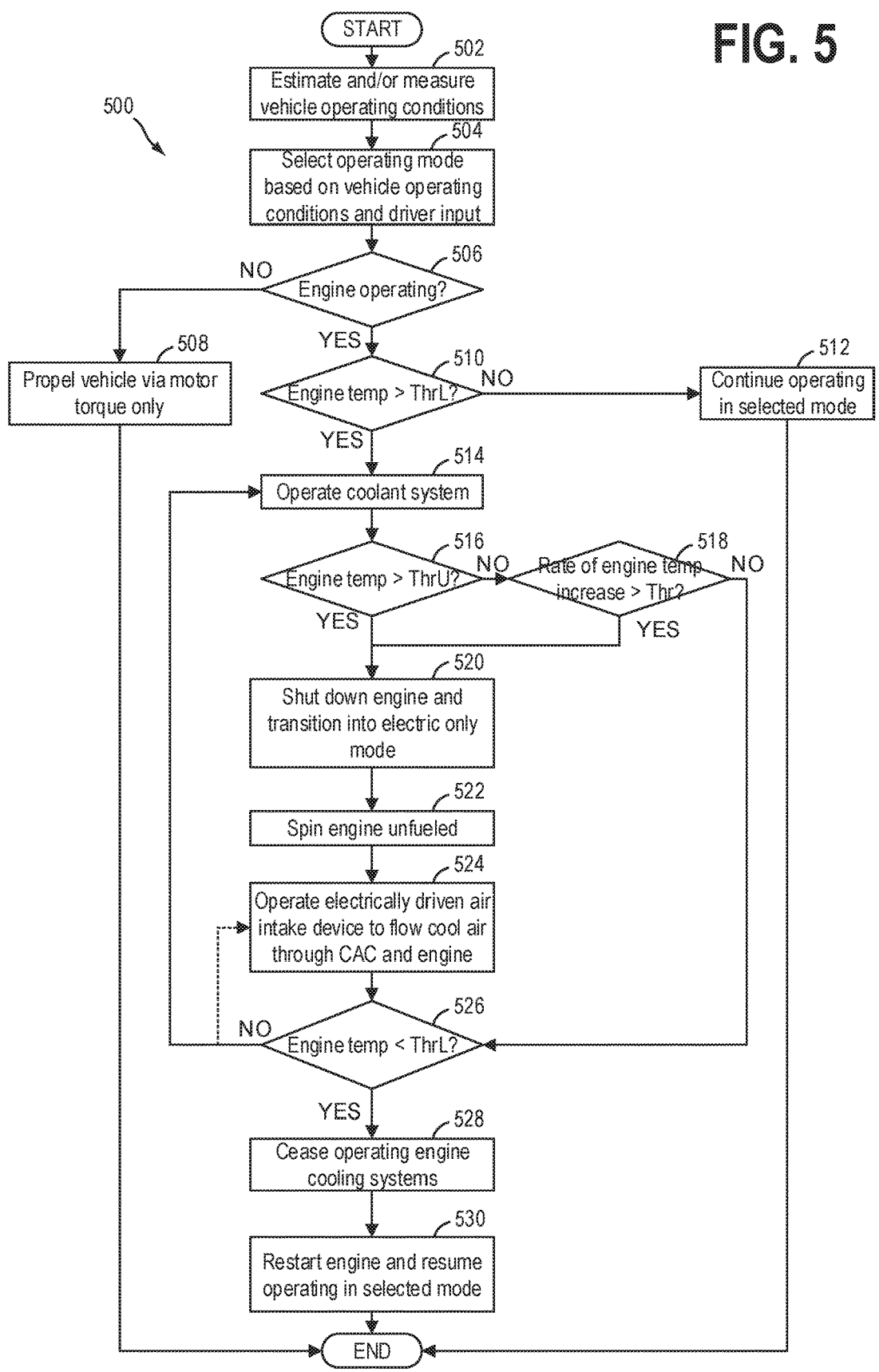
FIG. 5 shows a high level flowchart of an example method for cooling an engine of a hybrid electric vehicle.

Likewise, as elaborated with reference to FIG. 5, based at least upon an engine temperature, control system 217 may transition a hybrid vehicle into an electric-only mode (in which a vehicle is propelled solely using motor torque from an electric motor) prior to operating EDIAC 113 in conjunction with unfueled engine spinning in order to reduce engine 211 temperature. As an example, a vehicle being propelled with at least some engine torque may be switched to the electric only mode responsive to an indication that engine 211 temperature is greater than a threshold, or an anticipated overheating of the engine based on a current rate of rise in engine temperature. Subsequent to transitioning into electric only mode, control system 217 may spin engine 211 unfueled via a starter motor while enabling EDIAC 113 rotation via an electric motor to direct intake air through CAC 218. After passing through CAC 218 and being cooled, intake air will be drawn into and expelled from engine cylinders by the pumping action of cylinder pistons of the spinning engine. Consequently, heat may be rejected from the engine cylinders and engine 211 temperature can be reduced.

The EDIAC of FIGS. 1-2 may have various embodiments. FIGS. 3A-3C show three example EDIAC embodiments. EDIAC 113 includes at least an intake compressor driven by an electric motor, wherein motor operation is controlled by a vehicle control system (such as vehicle control system 217 of FIG. 2 or control system 190 of FIG. 1). Said compressor is positioned upstream of a CAC. By this arrangement, torque provided by the motor may spin the compressor causing an increase in the flow of air through engine cylinders.

FIG. 3A shows a first example embodiment 310 of an EDIAC included in an electric turbocharger, and as such is the embodiment depicted in the boosted engine system of FIG. 2. The electric turbocharger of FIG. 3A includes intake air compressor 214 mechanically coupled to a turbine along turbocharger shaft 219. Turbine 216 is spun by the flow of expanding exhaust gases expelled from the engine. In one example, compressor 214 and turbine 216 may be coupled within a twin scroll turbocharger. Turbine geometry may be actively varied as a function of engine speed, torque demand, and other operating conditions. By adjusting the speed of turbine 216, a speed of compressor 214 may be adjusted.

Compressor 214 is further coupled to an electric motor 213. In the depicted example, electric motor 213 is coupled to the turbocharger shaft, thereby making it able to provide an electric assist to each of compressor 214 and turbine 216. In other examples, electric motor 213 may be selectively coupled to compressor 214 so that a speed of compressor 214 can be adjusted distinct from the speed of turbine 216. Motor 213 may be selectively coupled to compressor 214 via a shaft, a belt, gear system, or any other mechanical coupling which enables torque generated by electric motor 213 to be used for spinning compressor 214. The motor 213 may be built into a common housing with the compressor such that compressor 214 and motor 213 are housed within the same structure. Motor 213 may be supplied with power by an energy storage device, such as battery 258.

In the depicted configuration, responsive to an increase in torque demand, torque may be provided to compressor 214 by motor 213, turbine 216, or both motor 213 and turbine 216 simultaneously. Alternatively, responsive to a decrease in torque demand, excess engine torque may be absorbed at the motor 213. In this way motor 213 can be operated as a generator to produce electrical energy, either for immediate consumption by vehicle systems or for storage in an electrical storage device, such as battery 258.

Referring to FIG. 3B, a second example embodiment 320 of an EDIAC is shown in an electric supercharger. The electric supercharger of FIG. 3B includes compressor 304 which may be mechanically coupled via a shaft 310 to an electric motor 213. In other examples, motor 213 may be mechanically coupled to compressor 304 via belt, gear system, or other mechanical coupling which enables torque generated by electric motor 213 to be transmitted to, and operate, compressor 304. The motor 213 may be built into a common housing with the compressor 304. Motor 213 may be supplied with power by an energy storage device, such as battery 258. Torque is provided to compressor 304 from motor 213. An output of motor 213 may be adjusted by a control system based on operating conditions including torque demand.

In some examples, where the engine system is a staged boosted engine system, the supercharger may be coupled upstream or downstream of a turbocharger compressor along the intake passage so that the supercharger compressor can be operated to provide boost while a turbine spins up.

FIG. 3C shows a third example embodiment 330 of an EDIAC included in an e-booster. The e-booster of FIG. 3C is coupled downstream of a turbocharger compressor 305 mechanically coupled via a shaft 219 to turbine 216. Turbine 216 is spun by the flow of expanding exhaust gases expelled from the engine. In one example, compressor 305 and turbine 216 may be coupled within a twin scroll turbocharger. Turbine 216 geometry may be actively varied as a function of engine speed and other operating conditions. Downstream of compressor 305 lies the electrically operated compressor 306 which is electrically actuated via electric motor 213. The electrically operated compressor may be used to supplement the boost output provided by the turbocharger compressor 305 and/or to provide boost during conditions when the turbine is being spun up. In one example, the electrically operated compressor 306 may be housed within the same body or structure as the electric motor 213. Electric motor 213 may be supplied with power by an energy storage device, such as battery 258. Electrically operated compressor 306 may spin proportional to a supplied current from battery 258. Air flow from compressor 305 may flow to the intake manifold along intake passage 309 and/or through bypass conduit 307 housing the electrically operated compressor 306. Bypass valve 308, which lies downstream of turbocharger compressor 305, may control the proportion of compressed air flowing along intake passage 309 relative to bypass conduit 307. Specifically, when valve 308 is fully open, air flow from turbocharger compressor 305 may bypass electrically operated compressor 306 and when bypass valve 308 is fully closed, all the air from the turbocharger compressor may flow through bypass conduit 307. Bypass valve 308 may be a normally open valve, such that under most operating conditions air flow bypasses electrically operated compressor 306. Bypass valve 308 may be closed during engine running conditions when the turbocharger compressor is spinning up, as well as during idle-stop conditions when engine cooling is requested. Bypass valve 308 may be a proportional valve such that the amount of air flow through conduit 307 may be proportional to the position of bypass valve 308.

A control system, such as control system 217 of FIG. 2, may determine one or more operating parameters of the electrically actuated intake air compressor based upon measured or inferred engine operating conditions. As an example, the speed of electrically operated compressor 306 may be based upon the speed of turbine 216, a driver pedal position, vehicle speed, engine torque demand, intake manifold pressure, etc. As a further example, based upon the turbine speed being greater than a threshold, or based upon an intake manifold or boost pressure being greater than a threshold, control system 217 may operate the electric motor as a generator and produce electrical energy which is stored in the energy storage device.

The EDIAC of FIG. 3C may be operated by vehicle control system 217 in various modes. As an example, at low vehicle speeds and upon a driver request for additional engine torque, bypass valve 308 may be closed while electrically operated compressor 306 may be spun via motor 213 to quickly provide a required intake air pressure. Upon a determination by control system 217 that turbine 216 is able to provide sufficient torque to compressor 305 to meet a desired intake manifold pressure, electrically operated compressor 307 may be shut-off and bypass valve 308 returned to its open position. By employing electrically operated compressor 307 to rapidly provide increased intake manifold pressure, the "turbo lag" associated with traditional turbochargers is avoided.

In addition to using the EDIAC for boost pressure control, EDIAC operation may be used to cool an engine responsive to actual or predicted/anticipated engine overheating. As elaborated with reference to FIGS. 4-5, EDIAC operation accompanied by unfueled engine spinning may be employed during vehicle idle-stops or after transitioning a hybrid vehicle to an electric only mode to cool the engine.

Turning to FIG. 4, a high level flowchart of an example method 400 for cooling an engine during an idle-stop is shown. Method 400 may be employed by an engine and comprises, responsive to idle-stop conditions being met, including engine temperature less than a threshold, shutting down an engine until restart conditions are met. Method 400 further comprises, responsive to idle-stop conditions being met and an engine temperature being higher than the threshold, spinning the engine unfueled and operating an EDIAC to flow air, cooled upon passage through a charge air cooler, through the engine until the engine temperature is lower than the threshold, and then shutting down the engine until restart conditions are met. Method 400 enables engine cooling to be provided when other methods of engine cooling are unable to maintain engine temperatures within a desired range. Consequently, employing method 400 may reduce the probability and/or extent of engine overheating. Method 400 will be described with reference to the systems described herein and shown in FIGS. 1-2 and 3A-3C, though it will be appreciated that similar methods may be applied to other systems without departing from the scope of this disclosure. Instructions for carrying out method 400 and the rest of the methods included herein may be executed by a control system, such as control system 190 of FIG. 1 and control system 217 of FIG. 2, based on instructions stored in non-transitory memory, and in conjunction with signals received from sensors of the engine system, such as temperature sensors, pressure sensors, and other sensors described in FIGS. 1-2 and 3A-3C. The controller may employ actuators of the engine to adjust engine operation according to the methods described below.

Method 400 begins at 402 and includes evaluating current vehicle and engine operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Method 400 then proceeds to 404.

At 404, method 400 includes confirming that idle-stop conditions are met. Idle-stop conditions may include the engine being in operation (e.g., carrying out combustion), engine and emissions components (e.g. exhaust catalyst, UEGO sensor, etc.) being above a threshold temperature, a battery state of charge (SOC) being above a threshold (e.g., at least 30%), vehicle running speed being under a threshold speed (e.g., below 30 mph), and an engine starting motor being operation ready. Additionally it may be verified that the air conditioner did not issue a request for restarting the engine, as may be requested if air conditioning is desired.

The driver requested torque may be estimated to indicate that it is less than a predetermined threshold value. Any or all of the idle-stop conditions may need to be confirmed for an idle-stop to be initiated. If the idle-stop conditions are not met at 404, then at 408, the method includes maintaining the engine running including continuing to combust fuel in engine cylinders.

If idle-stop conditions are met, then at 406, the method includes executing an automatic idle-stop, wherein an engine is deactivated and spun to rest. Specifically, responsive to idle-stop conditions being met, the vehicle controller may automatically (that is, without a driver requesting engine shutdown) deactivate engine fuel injection and spin the engine to rest. By enabling automatic engine stopping when all idle-stop conditions are met, fuel economy may be improved.

At 410, while in idle-stop, such as while spinning the engine down to rest or while the engine is at rest, the method includes determining if the engine temperature is greater than a threshold temperature. The engine temperature may be determined based on a cylinder head temperature, or an engine coolant temperature. For example, the engine temperature may be determined directly based on the output of a cylinder head or engine coolant temperature sensor (e.g., via a thermocouple mounted in the engine block). Alternatively, the engine temperature may be based on a model or algorithm as a function of the measured engine coolant or cylinder head temperature. In addition to estimating the engine temperature, the controller may also determine an actual rate of rise of the engine temperature, and/or a predicted or anticipated rate of rise of the engine temperature based on the engine conditions such as the engine speed, engine load, boost pressure, and torque demand.

In one example, the threshold temperature is a lower threshold temperature (ThrL) such as 240° F. The threshold temperature may correspond to a temperature above which engine cooling may be desired and may be determined as a function of engine speed and load. The threshold temperature (ThrL) may be further determined as a function of a desired engine temperature.

If the engine temperature is below ThrL at 410, method 400 may proceed to 426 where the vehicle is maintained in an idle-stop until auto-restart conditions are met at 428. Automatic engine restart conditions may be considered met if the engine is currently undergoing an idle-stop (no fuel being combusted in the engine), the torque requested by the driver is above a predetermined threshold (such as the operator tipping in), a request has been made to restart the vehicle air conditioning system, or if the battery 258 requires charging via engine operation. The restart conditions may be confirmed if any or all of the restart conditions are met. If auto-restart conditions are not met at 428, then the engine may be maintained in idle-stop until restart conditions are confirmed.

If the engine temperature is determined to be above ThrL, method 400 takes mitigating actions by proceeding to step 412. At 412, method 400 includes actuating one or more cooling fans, such as a radiator fan and a coolant fan of an engine cooling system, such as radiator fan 292 of coolant system 290 of FIG. 2. Operation of the coolant system fan(s) may blow air past radiator fins, increasing heat loss from the hot engine to ambient air. Optionally, the controller may also enable a coolant system pump (and open any necessary valves) to increase circulation of coolant through the engine block. As such, the coolant system pump and fans may be operated when the engine is running for temperature control, and may be disabled when the engine is shutdown. By selectively operating the fans and pump during the idle-stop, engine overheating due to the presence of residual engine heat and low ambient heat loss due to a vehicle being stationary (or almost stationary) can be averted.

Actuating the coolant system fan may include operating the fan at a speed based on the higher than threshold engine temperature, such as based on a difference between the measured engine temperature and the lower threshold temperature (ThrL) or a target engine temperature. As the difference increases, the fan speed may be increased and/or a number of coolant fans actuated in addition to the radiator fan may be increased. Likewise, actuating the coolant system pump may include operating the pump at a speed or flow output based on the higher than threshold engine temperature, such as based on a difference between the measured engine temperature and the lower threshold temperature (ThrL) or a target engine temperature. As the difference increases, the pump speed or output may be increased. Operating the coolant system fan(s) and pump(s) responsive to elevated engine temperature during an idle-stop may represent a first measure taken to reduce engine temperature responsive to a condition of engine overheating.

At 414, it may be determined if the engine temperature is greater than an upper temperature threshold, ThrU, higher than the lower threshold temperature ThrL. For example, it may be determined if the engine temperature measured at 402 is higher than each of the lower and the upper threshold temperature. Alternatively, where a single threshold temperature is applied, it may be determined if the engine temperature remains higher than the threshold temperature even after operating the coolant system fans and pumps. In one example, the engine temperature may be higher than the upper threshold temperature due to a higher degree of engine overheating having occurred. This may be, for example, due to high levels of heat being generated due to the engine operating boosted (at high boost pressures), at high loads, and with a high percentage of direct injected fuel (e.g., all fuel being direct injected) prior to the idle-stop. Further, due to the vehicle being stationary or static when the idle-stop is executed, under-hood temperatures may continue to rise even after the engine is shutdown during the idle-stop. As a result of a higher degree of engine heating, operation of the coolant system fans and pumps may not be sufficient to provide engine cooling.

In another example, the engine temperature may be higher than the upper threshold temperature due to degradation of an engine coolant system component. As non-limiting examples, insufficient cooling even after operating the coolant system fans and pumps may be due to loss of coolant from the coolant system (e.g., due to a system leak or due to a coolant sump not being refilled), degradation of a coolant system fan (e.g., the radiator fan), degradation of a coolant system pump, cylinder over-compression, and/or the presence of a blockage in coolant jackets/passages inside the cylinder head.

If the engine temperature is not higher than the upper threshold, then at 416 it may be determined if the rate of increase in engine temperature is greater than a threshold rate, ThrR. For example, the controller may measure an actual rate of increase in the engine temperature based on the output of the temperature sensors. Therein, even if the engine temperature is currently above ThrL but not currently above ThrU, it may be determined if the engine temperature is approaching ThrU. In another example, the rate of increase in engine temperature may be predicted or modeled based on the current engine temperature and further based on ambient conditions such as ambient humidity, and ambient wind flow. For example, if the ambient humidity is high (e.g., higher than a threshold), even with the vehicle being static, the engine temperature may not be expected to rise above ThrU due to the heat absorbing effect of the ambient humidity. Alternatively, due to the elevated ambient humidity, the engine temperature may be expected to rise slowly enough that further actions are not required, such as due to the engine likely to be restarted before ThrU is reached. As another example, if the ambient humidity is low (e.g., lower than the threshold), due to the vehicle being static, the engine temperature may be expected to rise above ThrU, the rate of rise increasing as ambient wind flow decreases. Herein the engine temperature may be expected to rise quickly enough that further actions are required, such as due to the engine likely to remain in idle-stop at the time ThrU is reached.

If the engine temperature is higher than the upper threshold (or above the lower threshold even after operating the coolant system fans and pumps), or if the rate of increase in engine temperature is higher than the threshold rate, then the controller proceeds to operate an electrically actuated intake air compressor to provide additional cool air for rapid engine cooling. Specifically, at 418, the method includes, spinning the engine unfueled. The engine may be spun unfueled via a starter motor or via an electric motor coupled to the driveline and transmission of the hybrid vehicle. The engine may be spun unfueled at a rate based on engine temperature and engine operating conditions, for example at 500 RPM. The rate of unfueled engine spinning may be based on the state of charge of batteries providing energy to the engine spinning motor, or may be based on the engine temperature or the rate of engine temperature increase. By spinning the engine unfueled, intake air may be drawn into the engine and circulated through engine cylinders.

Next, at 420, method 400 includes the control system actuating an EDIAC to route the intake air to engine cylinders via a CAC where the air is cooled before being delivered to engine cylinders. In this way, by spinning the engine while also operating the intake compressor, an amount and rate of cooled air flow through engine cylinders can be increased, increasing the rate of heat loss from the engine, and expediting engine cooling.

Operating the intake compressor includes actuating an electric motor coupled to the intake compressor to spin the compressor at a speed based on the engine temperature. In one example, a duty cycle commanded to the electric motor may be based on one or more of a difference between the current engine temperature and the threshold temperature (e.g., based on a difference between the current engine temperature and ThrU or ThrL), and the rate of rise of the engine temperature. For example, as the difference increases, or the rate of rise increases, the duty cycle commanded to the motor may be increased, causing the motor speed and output to increase, and correspondingly increasing a rotation speed of the intake compressor. In one example, the controller may use a look-up table, model, or algorithm that uses the current engine temperature and the target engine temperature as inputs, computes a corresponding compressor speed required to reduce the current engine temperature to the target engine temperature, and outputs a duty cycle to be commanded to the electric motor to achieve the desired level of engine cooling. In another example, the control system may adjust an output of the EDIAC's electric motor to operate the EDIAC's intake compressor at a speed based on each of the difference between the engine temperature and the threshold, and the rate of rise of the engine temperature, the output and the corresponding speed increased as the difference or the rate of rise increases. In this manner, an intake compressor may be used to assist in engine cooling, wherein the extent of EDIAC assisted engine cooling may be based upon the extent of engine overheating, as indicated by the engine temperature or the rate of engine temperature increase. Method 400 may then proceed to 422.

At 422, method 400 may include measuring the engine temperature and evaluating if sufficient engine cooling has occurred. For example, it may be determined if the engine temperature is below the threshold (such as below the lower threshold ThrL). If the engine temperature is not below the threshold even after operating the cooling fans and the intake compressor, then the method returns to 412 (or 420, as showed via a dashed line) to continue cooling the engine via the cooling fans and the intake compressor operation.

If the engine temperature is below ThrL, it may be inferred that no further engine cooling is required. Accordingly, at 424, the method includes ceasing cooling system operations. In one example, if only the coolant system fans and pumps were operational, ceasing coolant system operation may include disabling coolant pump, and radiator fan operation. In another example, if the EDIAC was being operated to assist in engine cooling, the intake compressor may be disabled by disabling the electric motor coupled to the intake compressor. In addition to disabling the coolant system fans and intake compressor, the controller may also case spinning the engine unfueled. For example, the controller may disable the starter motor, and since the engine was not being fueled, the engine may be spun to rest and held in the idle-stop status. Method 400 may then proceed to 428.

At 428, method 400 may include verifying if automatic restart conditions have been met. Automatic restart conditions may include the engine being currently in idle-stop status (with no fuel being combusted in the engine), the torque requested by the driver being above a predetermined threshold (such as the operator tipping in), a request having been made to restart the vehicle air conditioning system, and the SOC of the system battery being below a predetermined threshold and thus requiring charging via engine operation. Automatic restart conditions may be confirmed if any of the above-listed conditions are met. If automatic restart conditions are not met, at 426, the controller may maintain the engine in idle-stop status until the automatic restart conditions are met. For example, the engine may be maintained at rest. If and when the automatic restart conditions are met, method 400 may proceed to 430.

At 430, method 400 includes executing an automatic restart. Restarting the engine may include cranking the engine via the starter motor until a threshold engine speed is reached, and then resuming engine fueling. In one example, on the automatic engine restart, the engine may be fueled to provide a defined engine speed profile and a target engine torque. Method 400 may then end.

It will be appreciated that if automatic restart conditions are met anytime during the execution of routine 400, such as during the engine cooling, the engine cooling may be aborted and engine restart may be resumed. For example, if the restart conditions are met while the engine is being cooled via operation of cooling fans, the fans may be disabled and the engine may be restarted. As another example, if the restart conditions are met while the engine is being spun unfueled via the starter motor, and with the intake compressor spinning, the controller may disable the electric motor to decelerate the intake compressor. The controller may continue spinning the engine via the starter motor until a cranking speed is reached, and then resume cylinder fueling.

In this way a vehicle control system may mitigate engine overheating by spinning an engine unfueled while operating an EDIAC to route air to engine cylinders via a charge air cooler responsive to an idle-stop event and while an engine temperature is greater than a threshold (ThrU). EDIAC assisted engine cooling may continue in this way until the engine temperature is below a threshold temperature (ThrL), at which point the vehicle control system may spin the engine to rest.

While the method of FIG. 4 addresses engine overheating during conditions when a vehicle is static, it will be appreciated that EDIAC assisted engine cooling may also be leveraged for engine cooling in other situations where a vehicle is being propelled, such as in HEVs or PHEVs. FIG. 5 depicts a high level flowchart of an example method 500 for cooling an engine of a hybrid vehicle (e.g., of an HEV or PHEV) using an EDIAC while transiently propelling the vehicle using only motor torque. In this way, an overheated engine may be cooled while the hybrid vehicle is being propelled.

Method 500 begins at 502 and includes evaluating current vehicle and engine operating conditions. Operating conditions may be estimated, measured, and/or inferred, and may include one or more vehicle conditions, such as vehicle speed, vehicle location, battery state of charge, etc., various engine conditions, such as engine status (on or off), engine load, engine temperature, engine speed, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Method 500 then proceeds to 504.

At 504 method 500 includes operating the hybrid vehicle in a propulsion mode based on driver input and vehicle operating conditions. As one example, the vehicle may be operated in an electric only mode wherein the vehicle is propelled via motor torque only. The electric only mode may be selected when the operator torque demand is less than a threshold and the battery state of charge is higher than a threshold SOC. As another example, the vehicle may be operated in an engine only mode wherein the vehicle is propelled via engine torque only. The engine only mode may be selected when the operator torque demand is higher than the threshold or the battery state of charge is lower than the threshold SOC. As a further example, the vehicle may be operated in an assist mode wherein the vehicle is propelled via each of engine torque and motor torque, a ratio of engine torque to motor torque adjusted based on various operating conditions. The assist mode may be selected when the operator torque demand is higher than an upper threshold, wherein only motor torque is insufficient to propel the vehicle. After selecting an operating mode, method 500 may proceed to 506.

At 506, method 500 may include determining if the engine is operating, that is, if the engine is combusting fuel. For example, the vehicle engine will be combusting fuel if the vehicle is in engine only or assist mode of operation. If the engine is not operating, at 508, the method includes continuing to propel the vehicle with motor torque only. Herein it is inferred that no engine cooling is required and method 500 may end.

If at 506 it is determined that the vehicle engine is in operation, method 500 may proceed to evaluate engine temperatures to determine if the engine is overheating, and if so, take appropriate mitigating actions.

Specifically, at 510 the method includes determining if the engine temperature is greater than a threshold temperature. The engine temperature may be determined based on a cylinder head temperature, or an engine coolant temperature. For example, the engine temperature may be determined directly based on the output of a cylinder head or engine coolant temperature sensor (e.g., via a thermocouple mounted in the engine block). Alternatively, the engine temperature may be based on a model or algorithm as a function of the measured engine coolant or cylinder head temperature. In addition to estimating the engine temperature, the controller may also determine an actual rate of rise of the engine temperature, and/or a predicted or anticipated rate of rise of the engine temperature based on the engine conditions such as the engine speed, engine load, boost pressure, and torque demand.

In one example, the threshold temperature is a lower threshold temperature (ThrL) such as 240° F. The threshold temperature may correspond to a temperature above which engine cooling may be necessary and may be determined as a function of engine speed and load. The threshold temperature (ThrL) may be further determined as a function of a desired engine temperature.

If the engine temperature is below ThrL at 510, method 500 may proceed to 512 wherein the vehicle will continuing operating in the currently selected mode.

If the engine temperature is determined to be above ThrL, method 500 takes mitigating actions by proceeding to step 514. At 514, method 500 includes actuating one or more cooling fans, such as a radiator fan and a coolant fan of an engine cooling system, such as radiator fan 292 of coolant system 290 of FIG. 2. Operation of the coolant system fan(s) may blow air past radiator fins, increasing heat loss from the hot engine to ambient air. Optionally, the controller may also enable a coolant system pump (and open any necessary valves) to increase circulation of coolant through the engine block. As such, the coolant system pump and fans may be operated when the engine is running for temperature control, and may be disabled when the engine is shutdown.

Actuating the coolant system fan may include operating the fan at a speed based on the higher than threshold engine temperature, such as based on a difference between the measured engine temperature and the lower threshold temperature (ThrL) or a target engine temperature. As the difference increases, the fan speed may be increased and/or a number of coolant fans actuated in addition to the radiator fan may be increased. Likewise, actuating the coolant system pump may include operating the pump at a speed or flow output based on the higher than threshold engine temperature, such as based on a difference between the measured engine temperature and the lower threshold temperature (ThrL) or a target engine temperature. As the difference increases, the pump speed or output may be increased. Operating the coolant system fan(s) and pump(s) responsive to elevated engine temperature during an idle-stop may represent a first measure taken to reduce engine temperature responsive to a condition of engine overheating. Method 500 may then proceed to 516.

At 516, it may be determined if the engine temperature is greater than an upper temperature threshold, ThrU, greater than the lower threshold temperature ThrL. For example, it may be determined if the engine temperature measured at 502 is higher than each of the lower and the upper threshold temperatures. Alternatively, where a single threshold temperature is applied, it may be determined if the engine temperature remains higher than the threshold temperature even after operating the coolant system fans and pumps. As a result of a higher degree of engine heating, operation of only the coolant system fans and pumps may not be sufficient to provide engine cooling.

In another example, the engine temperature may be higher than the upper threshold temperature due to degradation of an engine coolant system component. As non-limiting examples, insufficient cooling even after operating the coolant system fans and pumps may be due to loss of coolant from the coolant system (e.g., due to a system leak or due to a coolant sump not being refilled), degradation of a coolant system fan (e.g., the radiator fan), degradation of a coolant system pump, cylinder over-compression, and/or the presence of a blockage in coolant jackets/passages inside the cylinder head.

If the engine temperature is not higher than the upper threshold, then at 518 it may be determined if the rate of increase in engine temperature is greater than a threshold rate, ThrR. For example, the controller may measure an actual rate of increase in the engine temperature based on the output of the temperature sensors. Therein, even if the engine temperature is currently above ThrL but not currently above ThrU, it may be determined if the engine temperature is approaching ThrU. In another example, the rate of increase in engine temperature may be predicted or modeled based on the current engine temperature and further based on ambient conditions such as ambient humidity, and ambient wind flow. For example, if the ambient humidity is high (e.g., higher than a threshold), even with the vehicle being static, the engine temperature may not be expected to rise above ThrU due to the heat absorbing effect of the ambient humidity.

If the engine temperature is higher than the upper threshold (or above the lower threshold even after operating the coolant system fans and pumps), or if the rate of increase in engine temperature is higher than the threshold rate, then the controller proceeds take mitigating action by proceeding to step 520.

At 520, method 500 has determined that the vehicle engine is in operation, and that additional engine cooling is required. Thus at 520, the method includes transiently propelling the hybrid vehicle using only motor torque, i.e., in an electric only mode. This includes forcing a vehicle propulsion system to transition from engine only mode or assist mode to electric only mode even if conditions for propelling the vehicle using engine torque are otherwise met. The transitioning may include pulling down the engine by disabling fuel and spinning the engine to rest. By transitioning the vehicle to being propelled using only motor torque responsive to elevated engine temperature during vehicle propulsion with at least engine torque, the engine may be deactivated without interrupting vehicle propulsion. With engine fueling terminated, the subsequent steps of the EDIAC assisted engine cooling may be carried out. Method 500 then proceeds to 522.

At 522, the method includes, spinning the engine unfueled. The engine may be spun unfueled via a starter motor or via motor torque from the electric motor coupled to the driveline and transmission of the hybrid vehicle. For example, motor torque may be used to both propel the vehicle as well as spin the engine unfueled. The engine may be spun unfueled at a rate based on engine temperature and engine operating conditions, for example at 500 RPM. The rate of unfueled engine spinning may be based on the state of charge of batteries providing energy to the motor, or may be based on the engine temperature or the rate of engine temperature increase. By spinning the engine unfueled, intake air may be drawn into the engine and circulated through engine cylinders.

Next, at 524, method 500 includes the control system actuating an EDIAC to route the intake air to engine cylinders via a CAC where the air is cooled before being delivered to engine cylinders. In this way, by spinning the engine while also operating the intake compressor, an amount and rate of cooled air flow through engine cylinders can be increased, increasing the rate of heat loss from the engine, and expediting engine cooling.

Operating the intake compressor includes actuating an electric motor coupled to the intake compressor to spin the compressor at a speed based on the engine temperature. In one example, a duty cycle commanded to the electric motor may be based on one or more of a difference between the current engine temperature and the threshold temperature (e.g., based on a difference between the current engine temperature and ThrU or ThrL), and the rate of rise of the engine temperature. For example, as the difference increases, or the rate of rise increases, the duty cycle commanded to the motor may be increased, causing the motor speed and output to increase, and correspondingly increasing a rotation speed of the intake compressor. In one example, the controller may use a look-up table, model, or algorithm that uses the current engine temperature and the target engine temperature as inputs, computes a corresponding compressor speed required to reduce the current engine temperature to the target engine temperature, and outputs a duty cycle to be commanded to the electric motor to achieve the desired level of engine cooling. In another example, the control system may adjust an output of the EDIAC's electric motor to operate the EDIAC's intake compressor at a speed based on each of the difference between the engine temperature and the threshold, and the rate of rise of the engine temperature, the output and the corresponding speed increased as the difference or the rate of rise increases. In this manner, an intake compressor may be used to assist in engine cooling, wherein the extent of EDIAC assisted engine cooling may be based upon the extent of engine overheating, as indicated by the engine temperature or the rate of engine temperature increase. Method 500 may then proceed to 526.

At 526, method 500 may include measuring the engine temperature and evaluating if sufficient engine cooling has occurred. For example, it may be determined if the engine temperature is below the threshold (such as below the lower threshold ThrL). If the engine temperature is not below the threshold even after operating the cooling fans and the intake compressor, then the method returns to 514 (or 524, as showed via a dashed line) to continue cooling the engine via the cooling fans and the intake compressor operation.

If the engine temperature is below ThrL, it may be inferred that no further engine cooling is required. Accordingly, at 528, the method includes ceasing cooling system operations. In one example, if only the coolant system fans and pumps were operational, ceasing coolant system operation may include disabling coolant pump, and radiator fan operation. In another example, if the EDIAC was being operated to assist in engine cooling, the intake compressor may be disabled by disabling the electric motor coupled to the intake compressor. In addition to disabling the coolant system fans and intake compressor, the controller may also cease spinning the engine unfueled. For example, the controller may disable the starter motor, and since the engine was not being fueled, the engine may be spun to rest and held in an idle-stop status. Method 500 may then proceed to 530.

At 530, method 500 may include resuming the previously selected operating mode or an alternate nominal mode based on the current vehicle operating conditions. For example, after cooling the engine, the vehicle control system may resume propelling the vehicle with at least engine torque, such as by transitioning out of the electric-only mode and returning to an engine-only or assist mode. Therein, the control system may restart the engine and resume cylinder fueling, and cylinder combustion. Method 500 may then end.

Figure 6:
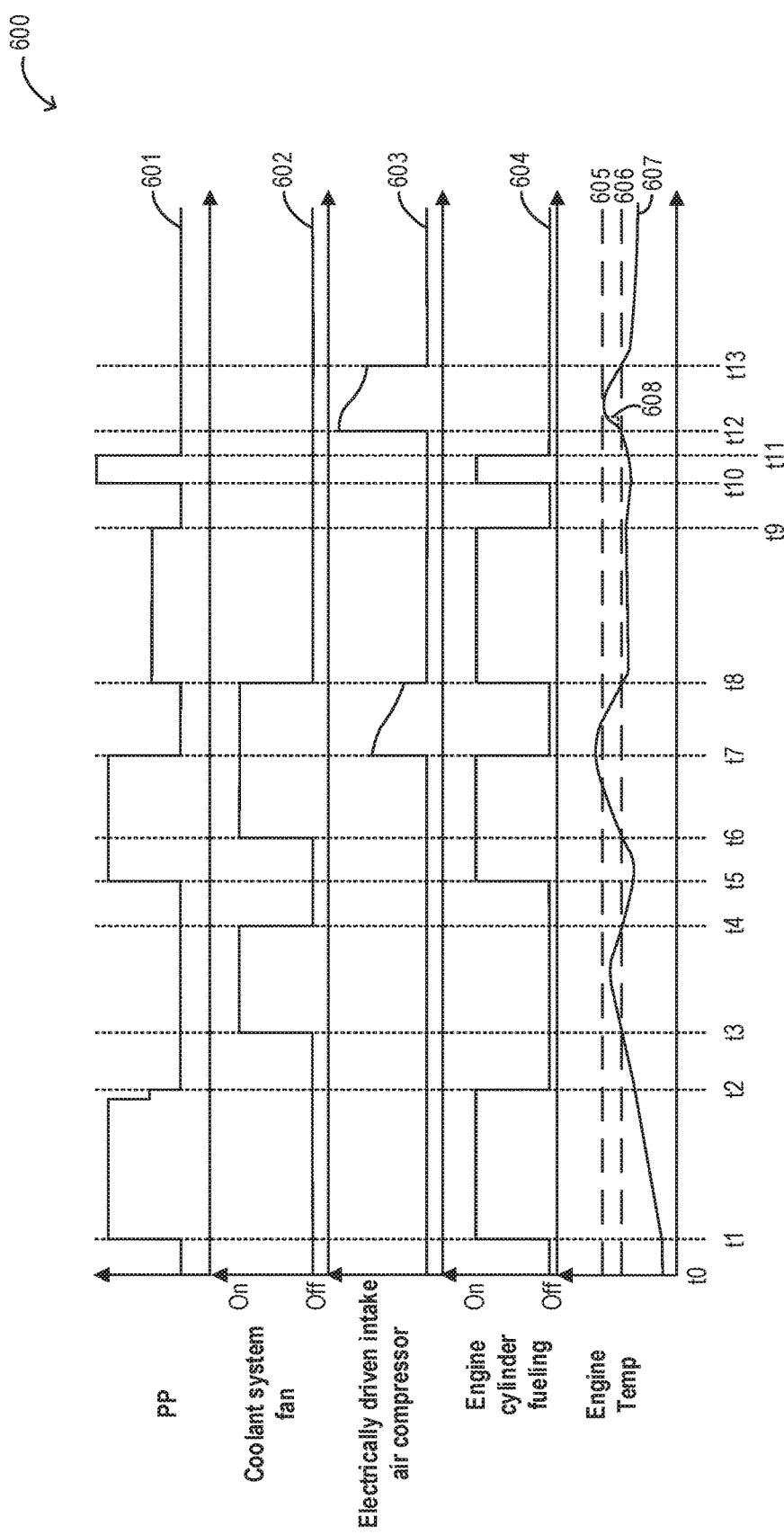
FIG. 6 shows a prophetic example of cooling an overheated engine during an idle-stop.
Figure 7:
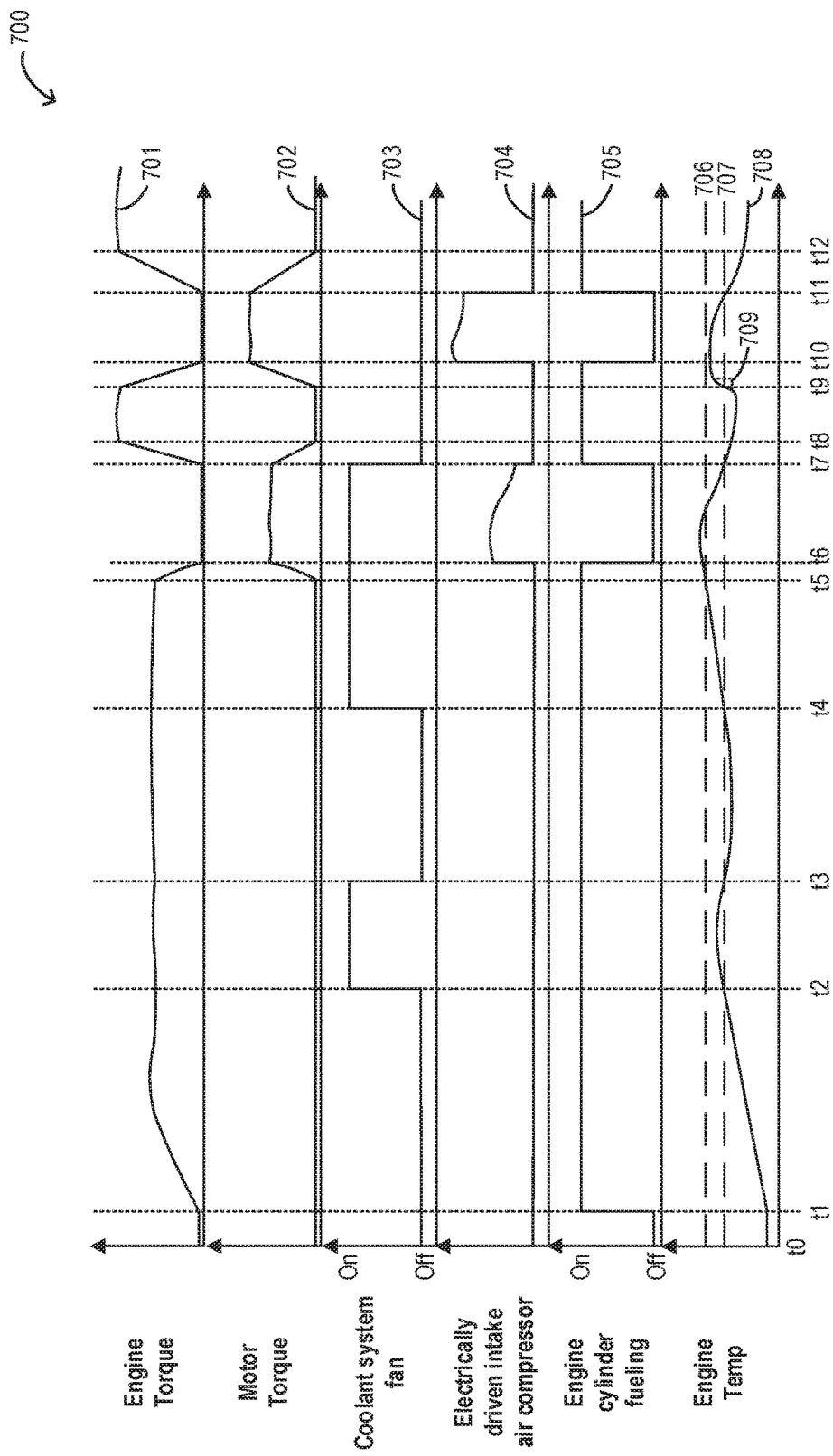
FIG. 7 shows a prophetic example of cooling an overheated engine of a hybrid electric vehicle.

FIG. 6 shows an example timeline 600 of cooling an overheated engine during idle-stops by operating an electrically actuated intake compressor. Timeline 600 includes plot 601 which shows the pedal position (PP) of a vehicle through time, the pedal position is reflective of operator torque demand. Timeline 600 also shows coolant system fan operation as a function of time at plot 602 and EDIAC speed (rate of spin) at plot 603. The coolant system fan is shown as either "on" or "off" however, the coolant system fan may be operated at various rates based upon engine temperature, and/or a rate of engine temperature change. Timeline 600 further includes plot 604, which shows if fuel is being delivered to the engine cylinders (on or off). Finally, timeline 600 includes plot 607 showing the engine temperature. Plot 607 further includes a lower temperature threshold 606 and an upper temperature threshold 605.

Prior to t1, the vehicle is at rest with the engine in idle-stop. At this time, the engine is unfueled (plot 604). The engine temperature (plot 607) is below lower threshold 606 because the engine has been idle-stopped for a while. Since the engine is idle-stopped and not overheating, the coolant system fan (plot 602) and intake compressor (plot 603) are not operating at this time.

At time t1, responsive to an operator tip-in event (plot 601), the driver demanded torque increases causing the engine to be restarted, and engine fueling begins as seen at plot 604. Also, the engine temperature begins to increase as the engine combusts fuel. Between times t1 and t2, the driver continues to demand torque as indicated by the change in pedal position (PP) and cylinder fueling continues while engine temperature continues to rise.

At time t2, responsive to an operator pedal tip-out event, there is a drop in torque demand. The engine has met idle-stop conditions at t2, and thus engine fueling ceases. Although engine fueling has ceased, engine temperature continues to rise between t2 and t3 due to vehicle being static causing air flow through the vehicle's under-hood to be limited.

At time t3, responsive to the engine temperature being greater than lower threshold 606, the coolant system fan is activated to cool the engine. Between times t3 and t4, the coolant system fan continues to operate, and consequently, the engine temperature decreases. In the depicted example, the coolant system fan is activated to a defined speed, however, it will be appreciated that in other examples, the fan speed may be adjusted based on the cooling demand.

At time t4, coolant system fan operation has reduced engine temperature below the lower temperature threshold 606. Thus, at t4, the coolant system fan is disabled. Between times t4 and t5, the engine remains in an idle-stop with the vehicle at rest and cylinder fueling remains disabled.

At time t5, responsive to another operator tip-in, the engine auto-restarts and, at t5, engine cylinder fueling resumes. Between times t5 and t6, the engine temperature begins to increase as a result of fuel combustion within the engine.

At time t6, the engine temperature has surpassed the lower temperature threshold 606. Consequently, the coolant system fan is operated to reduce engine temperature. However, between times t6 and t7, coolant system fan operation alone is unable to reduce engine temperature. This may be due to the engine operating at higher load. Consequently, the engine temperature continues to rise above the upper temperature threshold 605. As the engine is in operation between t6 and t7, the EDIAC may not be operated. However, at time t7 an operator tip-out enables the engine to execute an idle-stop. Consequently, engine cylinder fueling is terminated. Upon termination of engine cylinder fueling at t7, EDIAC operation begins. The rate of EDIAC spin is based upon the state of the coolant system fan (on or off), and further based upon the engine temperature and the rate of engine temperature change. As such, at t7, the EDIAC is operated at a moderate rate of spin as the coolant system fan is also in operation at this time. Between times t7 and t8, the engine temperature decreases owing to EDIAC and coolant system fan operation. Consequently, between times t7 and t8, the rate of EDIAC spin will decrease as the engine temperature decreases. By t8, the engine temperature has dropped below the lower temperature threshold 606, and thus coolant system fan and EDIAC operation is disabled.

Additionally, at time t8, an operator tip-in causes the engine to auto-restart. Consequently, engine cylinder fueling resumes and engine temperature begins to slowly rise. Between times t8 and t9, the vehicle is operated at relatively low torque demand as indicated by the pedal position (PP) of plot 601 which causes a minor increase in engine temperature. Between times t8 and t9, the vehicle control system determines that the engine coolant system has degraded (such as based on the output of a distinct cooling fan diagnostic routine). As a consequence, a flag is set indicating the degraded status of the engine coolant system, and coolant system fan operation is disabled until mitigating actions are taken. As one example, mitigating actions may include servicing the coolant system fan.

At time t9, an operator tip-out occurs, as indicated by the pedal position in plot 601. As a result, entry conditions for an idle-stop are met. As the idle-stop is executed, engine cylinder fueling ceases. As the engine temperature is below the lower temperature threshold 606 during the idle-stop, there is no need for EDIAC assisted engine cooling. As such, the EDIAC remains disabled between times t9 and t10.

At time t10, an operator tip-in causes the engine to auto-restart. Thus at t10, engine cylinder fueling resumes, and a brief period of high torque demand ensues between times t10 and t11. This brief period of high torque demand causes the engine temperature to increase.

At time t11, another operator tip-out enables the engine to execute an idle-stop. As a result, engine cylinder fueling ceases. Between times t11 and t12, the engine temperature increases despite the engine being in an idle-stop due to high ambient temperatures and reduced air flow through the radiator and around the engine (as the vehicle is static). At time t12, the engine temperature surpasses the lower temperature threshold 606. Additionally, the rate of engine temperature increase at t12 is greater than the threshold rate, as indicated by slope 608. Although the engine temperature is greater than the lower temperature threshold 606 at t12, due to a determination by the vehicle control system that the coolant system is degraded, the coolant system fan remains disabled. At t12, the engine temperature is greater than the lower temperature threshold 606 and increasing at a rate greater than a threshold rate 608. As such, the vehicle control system operates the EDIAC. Because the engine coolant system is degraded, the speed of EDIAC will be higher in order to provide sufficient cooling to the engine. Between times t12 and t13, the engine temperature decreases as a result of EDIAC operation in conjunction with unfueled engine spinning. Because the rate of EDIAC spin is based on the engine temperature, the rate of EDIAC spinning will decrease as engine temperature decreases. At time t13, the engine temperature has dropped below the lower temperature threshold 606. Consequently, the EDIAC is disabled. Timeline 600 then ends. Timeline 600 included several examples of an engine employing EDIAC assisted engine cooling during idle-stop events. Additionally, hybrid electric vehicles or plug in hybrid electric vehicles may employ EDIAC assisted engine cooling while being propelled, as previously detailed with reference to FIG. 5 and method 500. Timeline 700 includes several example scenarios of a hybrid electric vehicle employing method 500.

Timeline 700 shows the torque provided to the vehicle drive wheels by either the engine (plot 701) or the electric motor (plot 702) through time. Timeline 700 further includes the status (either on or off) of the coolant system fan (plot 703) or the rate of spin of the EDIAC compressor (plot 704). Timeline 700 also indicates if engine cylinder fueling is occurring (plot 705). Finally, timeline 700 shows engine temperature through time (plot 708). The lower temperature threshold 707, and the upper temperature threshold 706, are included in plot 708.

Prior to t1, the engine and motor are not in operation and, the engine is unfueled. The coolant system fan and EDIAC are inactive at this time. At time t1, a vehicle-on event occurs as indicated by initiation of engine cylinder fueling and engine torque. Between times t1 and t2, the vehicle operates in engine only mode, thus motor torque remains at zero. Between times t1 and t2, the engine torque increases to meet an increasing torque demand by the operator. As engine combusts fuel the engine temperature increases.

At time t2, the engine temperature has surpassed the lower temperature threshold 707, and as a consequence the coolant system fan is enabled. Between times t2 and t3, operation of the coolant system fan causes the engine temperature to decrease below the lower temperature threshold 707. Consequently, no additional engine cooling is required and the coolant system fan is disabled at t3. Between times t3 and t4, the vehicle continues operating in engine only mode while the engine temperature increases.

At time t4, fuel combustion within the engine has caused the engine temperature to increase above the lower temperature threshold 707. Consequently, the coolant system fan is again enabled. However, between times t4 and t5 the engine temperature continues to climb despite coolant fan operation. By time t5, the engine temperature has risen above the upper temperature threshold 706. Consequently, the vehicle transitions from engine only propulsion to electric only propulsion with a corresponding increase in motor torque to propel vehicle wheels. This is shown by the decreasing engine torque and increasing motor torque between times t5 and t6. By time t6, the engine is no longer providing any torque to the vehicle wheels and fueling of engine cylinders has ceased. At t6, the vehicle has fully transitioned into electric only propulsion. Thus, EDIAC assisted engine cooling may now begin. Between times t6 and t7 the EDIAC spins at a rate based upon the engine temperature and coolant system status. As the coolant system is in operation between t6 and t7, the EDIAC will be spun at a moderate rate, which decreases as the engine temperature decreases. EDIAC and coolant system fan operation reduce engine temperature between t6 and t7. By t7, the engine temperature has been reduced below the lower temperature threshold 707. Consequently, at t7 the coolant system fan is disabled and the EDIAC is spun to rest. Additionally, at t7 the vehicle control system initiates a transition from electric only propulsion back to the previously selected engine only propulsion. Consequently, engine cylinder fueling resumes. Between times t7 and t8, motor torque decreases to zero as engine torque increases to replace the decreasing motor torque. By t8, all propulsion torque is provided by the engine. Between times t8 and t9, the vehicle control system determines that the engine coolant system has degraded. As a consequence, a flag is set indicating the degraded status of the engine coolant system, and coolant system fan operation is disabled until mitigating actions are taken. Also between t8 and t9, the vehicle continues operating in engine only mode, and as such the engine temperature increases.

At time t9 the engine temperature has increased above the lower temperature threshold 707, and the rate of engine temperature increase is greater than a threshold rate, as indicated by slope 709. As the coolant system was determined previously to be degraded, the coolant system fan remains disabled at t9. At time t9, the vehicle control system initiates a transition from engine only propulsion to electric only propulsion. Between times t9 and t10 the transition between engine only propulsion and motor only propulsion occurs. At time t10, the vehicle is propelled entirely by motor torque, and consequently the engine cylinder fueling may cease. As a result, the EDIAC may be operated at a relatively high speed based upon the rate of engine temperature increase, and further based upon the degraded status of the coolant system. Between times t10 and t11, EDIAC assisted cooling causes the engine temperature to decrease and as such the EDIAC rate of spin decreases. By t11 the engine temperature has been reduced below the lower temperature threshold 707. Consequently, at t11, engine cooling is no longer required and the EDIAC compressor is spun to rest. Additionally, at t11, engine cylinder fueling may resume as the vehicle transitions once again from electric only to engine only propulsion. At t12 the vehicle is propelled entirely by engine torque and motor torque has decreased to zero. Timeline 700 then ends.

The systems described herein and with reference to FIGS. 1-3C, along with the methods described herein and with reference to FIGS. 4 and 5 may enable one or more systems and one or more methods. In one example, a method comprises responsive to engine temperature greater than a threshold temperature when engine idle-stop conditions are met, spinning the engine unfueled and operating an electric intake air compressor to route air to engine cylinders via a charge air cooler. In a first example of the method, continuing the operating until the engine temperature is below the threshold temperature, and then spinning the engine to rest. A second example of the method optionally includes example one and further includes during the operating, propelling the hybrid vehicle using motor torque. A third example of the method optionally includes one or more of examples one through two and further includes, wherein the electric intake air compressor includes an intake air compressor driven by an electric motor, the intake air compressor including one of an electric supercharger compressor driven by the electric motor, a turbocharger compressor coupled to each of the electric motor and an exhaust turbine, and an intake compressor driven by the electric motor and coupled in a bypass downstream of a turbine-driven intake compressor. A fourth example optionally includes one or more of examples one through three and further includes that a duty cycle commanded to the electric motor is based on each of a difference between the engine temperature and the threshold temperature, and a rate of rise of the engine temperature. A fifth example optionally includes one or more of examples one through four and further includes operating an engine coolant system fan responsive to the engine temperature greater than the threshold temperature. A sixth example of the method optionally includes one or more of examples one through five and further includes that the operating is further responsive to degradation of an engine coolant system, the degradation including one or more of coolant fan degradation, coolant pump degradation, and lower than threshold coolant level in the engine coolant system, the duty cycle commanded to the electric motor increased responsive to degradation of the engine coolant system. A seventh example of the method optionally includes one or more of examples one through six and further includes that the electric intake air compressor is positioned in an intake passage upstream of the charge air cooler. An eighth example of the method optionally includes one or more of examples one through seven and further includes that the engine temperature includes one of engine coolant temperature and cylinder head temperature. A ninth example of the method optionally includes one or more of examples one through eight and further include Another example method comprises, responsive to idle-stop conditions being met including engine temperature less than a threshold, shutting down an engine until restart conditions are met and responsive to idle-stop conditions being met and engine temperature higher than the threshold, spinning the engine unfueled and operating an electrically driven intake air compressor to flow air cooled upon passage through a charge air cooler through the engine until the engine temperature is lower than the threshold, and then shutting down the engine until restart conditions are met. In a first example of the method, the method includes that the intake compressor driven via the electric motor is coupled in a bypass passage downstream of another intake compressor driven via an exhaust turbine. A second example of the method optionally includes the first example and further includes that operating the intake compressor via the electric motor includes adjusting an output of the electric motor to operate the intake compressor at a speed based on each of a difference between the engine temperature and the threshold, and a rate of rise of the engine temperature, the output and the corresponding speed increased as the difference or the rate of rise increases. A third example of the method optionally includes any one or more of examples one and two and further includes that responsive to the engine temperature higher than the threshold, operating an engine coolant system fan. A fourth example of the method optionally includes one or more of examples one through three and further includes the output of the electric motor is further increased responsive to degradation of the engine coolant system fan.

An example of a system for a hybrid electric vehicle comprises an electric motor coupled to vehicle wheels; a battery coupled to the electric motor; an engine; a turbocharger including a first intake compressor driven by an exhaust turbine; a bypass coupled downstream of the first intake compressor, the bypass including a second intake compressor driven by the electric motor; a charge air cooler coupled downstream of each of the first and second intake compressor; a temperature sensor for estimating an engine temperature; and a controller with computer-readable instructions stored on non-transitory memory for: while propelling the hybrid vehicle with at least engine torque, responsive to engine temperature higher than a threshold, transitioning to propelling the vehicle with only motor torque, independent of a state of charge of the battery; disabling engine fueling and spinning the engine, unfueled, via the electric motor; operating the second intake compressor to flow air cooled via the charge air cooler to the spinning engine. In a first example, the system further includes an engine coolant system including a coolant pump, a coolant sump, and a cooling fan, wherein the controller includes further instructions for enabling the engine coolant system responsive to the higher than threshold engine temperature. A second example of the system optionally includes the first example and further includes that operating the second intake compressor includes operating the second intake compressor at a speed based on each of a difference between the engine temperature and the threshold, and a rate of rise in the engine temperature. A third example of the system optionally includes any one or more or each of the first and second examples and further includes that operating the second intake compressor further includes increasing the second intake compressor speed responsive to degradation of the engine coolant system, the degradation includes one of degradation of the coolant pump, degradation of the cooling fan, and lower than threshold level of coolant in the coolant sump. A four example of the system optionally includes any one or more or each of the first through third examples and further includes that the controller includes further instructions for: responsive to engine temperature lower than the threshold, restarting the engine and resuming propelling the vehicle with at least engine torque. A fifth example of the system optionally includes any one or more or each of the first through fourth examples and further includes that while propelling the hybrid vehicle with at least engine torque includes while engine idle-stop conditions are met.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims shall be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle method, comprising: responsive to engine temperature greater than a threshold temperature when engine idle-stop conditions are met and propulsion via engine torque, an engine including a first compressor transitioning to propulsion via only motor torque, spinning the engine unfueled via an electric motor; and operating a second electric intake air compressor to route air cooled via a charge air cooler to the spinning engine propelling the hybrid vehicle with at least engine torque, responsive to engine temperature higher than a threshold.

2. The method of claim 1, continuing the operating until the engine temperature is below the threshold temperature, and then spinning the engine to rest.

3. The method of claim 1, further comprising, during the operating, propelling the hybrid vehicle using motor torque.

4. The method of claim 1, wherein the second electric intake air compressor includes an intake air compressor driven by the electric motor, the intake air compressor including one of an electric supercharger compressor driven by the electric motor, a turbocharger compressor coupled to each of the electric motor and an exhaust turbine, and an intake compressor driven by the electric motor and coupled in a bypass downstream of a turbine-driven intake compressor.

5. The method of claim 4, wherein a duty cycle commanded to the electric motor is based on each of a difference between the engine temperature and the threshold temperature, and a rate of rise of the engine temperature.

6. The method of claim 5, further comprising, operating an engine coolant system fan responsive to the engine temperature greater than the threshold temperature.

7. The method of claim 5, wherein the operating is further responsive to degradation of an engine coolant system, the degradation including one or more of coolant fan degradation, coolant pump degradation, and lower than threshold coolant level in the engine coolant system, the duty cycle commanded to the electric motor increased responsive to degradation of the engine coolant system.

8. The method of claim 1, wherein the electric intake air compressor is positioned in an intake passage upstream of the charge air cooler.

9. The method of claim 1, wherein the engine temperature includes one of engine coolant temperature and cylinder head temperature.

10. A method for an engine, comprising: responsive to idle-stop conditions being met including engine temperature less than a threshold, shutting down an engine until restart conditions are met, the engine including a first compressor; and responsive to idle-stop conditions being met, vehicle propulsion via engine torque, and the engine temperature higher than the threshold, transitioning to vehicle propulsion via an electric motor; spinning the engine unfueled via the electric motor and operating a second electrically driven intake air compressor to flow air cooled upon passage through a charge air cooler through the spinning engine until the engine temperature is lower than the threshold, and then shutting down the engine until restart conditions are met.

11. The method of claim 10, wherein the second electrically driven intake compressor driven via the electric motor is coupled in a bypass passage downstream of the first compressor driven via an exhaust turbine.

12. The method of claim 10, wherein operating the second electrically driven intake compressor via the electric motor includes adjusting an output of the electric motor to operate the second electrically driven intake compressor at a speed based on each of a difference between the engine temperature and the threshold, and a rate of rise of the engine temperature, the output and the corresponding speed increased as the difference or the rate of rise increases.

13. The method of claim 12, further comprising, responsive to the engine temperature higher than the threshold, operating an engine coolant system fan.

14. The method of claim 13, wherein the output of the electric motor is further increased responsive to degradation of the engine coolant system fan.

15. A hybrid vehicle system, comprising: an electric motor coupled to vehicle wheels; a battery coupled to the electric motor; an engine; a turbocharger including a first intake compressor driven by an exhaust turbine; a bypass coupled downstream of the first intake compressor, the bypass including a second intake compressor driven by the electric motor; a charge air cooler coupled downstream of each of the first and second intake compressor; a temperature sensor for estimating an engine temperature; and a controller with computer-readable instructions stored on non-transitory memory for: while propelling the hybrid vehicle with at least engine torque, responsive to engine temperature higher than a threshold, transitioning to propelling the hybrid vehicle with only motor torque, independent of a state of charge of the battery; disabling engine fueling and spinning the engine, unfueled, via the electric motor; operating the second intake compressor to flow air cooled via the charge air cooler to the spinning engine.

16. The system of claim 15, further comprising an engine coolant system including a coolant pump, a coolant sump, and a cooling fan, wherein the controller includes further instructions for enabling the engine coolant system responsive to the higher than threshold engine temperature.

17. The system of claim 16, wherein operating the second intake compressor includes operating the second intake compressor at a speed based on each of a difference between the engine temperature and the threshold, and a rate of rise in the engine temperature.

18. The system of claim 16, wherein operating the second intake compressor further includes increasing the second intake compressor speed responsive to degradation of the engine coolant system, the degradation includes one of degradation of the coolant pump, degradation of the cooling fan, and lower than threshold level of coolant in the coolant sump.

19. The system of claim 15, wherein the controller includes further instructions for:
    responsive to engine temperature lower than the threshold, restarting the engine and resuming propelling the vehicle with at least engine torque.

20. The system of claim 15, wherein while propelling the hybrid vehicle with at least engine torque includes while engine idle-stop conditions are met.

* * * * *